(12) United States Patent
Mitchell, Jr. et al.

(10) Patent No.: US 11,912,219 B2
(45) Date of Patent: Feb. 27, 2024

(54) VEHICLE MOUNTED CHAIR ASSEMBLY

(71) Applicants: Richard Mitchell, Jr., Fredricksburg, VA (US); Sarah Ksiouar, Fredricksburg, VA (US)

(72) Inventors: Richard Mitchell, Jr., Fredricksburg, VA (US); Sarah Ksiouar, Fredricksburg, VA (US)

( * ) Notice: Subject to any disclaimer, the term of this patent is extended or adjusted under 35 U.S.C. 154(b) by 41 days.

(21) Appl. No.: 17/748,505

(22) Filed: May 19, 2022

(65) Prior Publication Data

US 2023/0373420 A1 Nov. 23, 2023

(51) Int. Cl.
*B60N 2/32* (2006.01)
*B60R 19/52* (2006.01)

(52) U.S. Cl.
CPC ............... *B60R 19/52* (2013.01); *B60N 2/32* (2013.01)

(58) Field of Classification Search
CPC .......... B60R 19/52; B60R 19/48; B60N 2/32; B60N 2/24; B60N 2/30; B60N 2/3038; B60N 2/304; B60N 2/3095; B60N 2/3097
See application file for complete search history.

(56) References Cited

U.S. PATENT DOCUMENTS

| | | | |
|---|---|---|---|
| 2,612,207 A | 9/1952 | Branson | |
| 2,781,081 A | 2/1957 | Hynes | |
| 3,865,431 A * | 2/1975 | Zakhi | B60N 2/3097 248/287.1 |
| 5,462,334 A | 10/1995 | Sedorcek | |
| D414,949 S | 10/1999 | Natale | |
| 6,196,612 B1 | 3/2001 | Grimes | |
| 6,932,408 B1 * | 8/2005 | Lyod, Jr. | B60N 2/005 5/118 |
| D651,820 S * | 1/2012 | Brown | D6/362 |
| 8,123,271 B1 * | 2/2012 | Wimberley | B60N 2/3095 296/57.1 |
| 8,833,518 B2 * | 9/2014 | Holcombe | A01M 31/02 297/440.1 |
| 9,211,012 B1 * | 12/2015 | Wilson, II | A47C 7/38 |
| 9,469,215 B2 * | 10/2016 | Mason | B60N 3/063 |
| 9,701,225 B1 * | 7/2017 | Hogan | A47C 4/52 |
| 9,802,514 B2 | 10/2017 | Troyer | |
| 9,981,608 B1 | 12/2018 | Do Vale | |
| 2015/0239372 A1 * | 8/2015 | Bauer | B60J 5/108 296/57.1 |

FOREIGN PATENT DOCUMENTS

WO WO9727075 7/1997

* cited by examiner

*Primary Examiner* — Amy R Weisberg
*Assistant Examiner* — Sara Laghlam

(57) ABSTRACT

A vehicle mounted chair assembly includes a grille guard that is mountable to a front end of a vehicle. A back rest is integrated into the grille guard such that the back rest extends upwardly in front of the series of members of the grille guard. A chair is pivotally coupled to the back rest. The chair is positionable in a deployed position having the chair lying on a horizontal plane to have an occupant is seated on the chair. Conversely, the chair is positionable in a stored position having the chair resting against the back rest.

6 Claims, 7 Drawing Sheets

VEHICLE MOUNTED CHAIR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chair devices and more particularly pertains to a new chair device for facilitating a law enforcement officer to seat a perpetrator on a front end of an emergency vehicle. The device includes a grille guard that is mounted to the front end of a vehicle and a chair that is hingedly coupled to the grille guard. The chair is positionable in a deployed position or a stored position. The chair includes a pair loops to facilitate the perpetrator to be handcuffed to a respective loop while the perpetrator is seated on the chair.

(2) Description of Related Art Including Information Disclosed Under 37 CFR 1.97 and 1.98

The prior art relates to chair devices including a variety of chairs that includes a mount for releasably engaging a bumper of a vehicle. The prior art discloses a seat for a law enforcement vehicle that includes a track positioned in a rear seat of a law enforcement vehicle and a chair slidably disposed on the track.

BRIEF SUMMARY OF THE INVENTION

An embodiment of the disclosure meets the needs presented above by generally comprising a grille guard that is mountable to a front end of a vehicle. A back rest is integrated into the grille guard such that the back rest extends upwardly in front of the series of members of the grille guard. A chair is pivotally coupled to the back rest. The chair is positionable in a deployed position having the chair lying on a horizontal plane to have an occupant is seated on the chair. Conversely, the chair is positionable in a stored position having the chair resting against the back rest.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
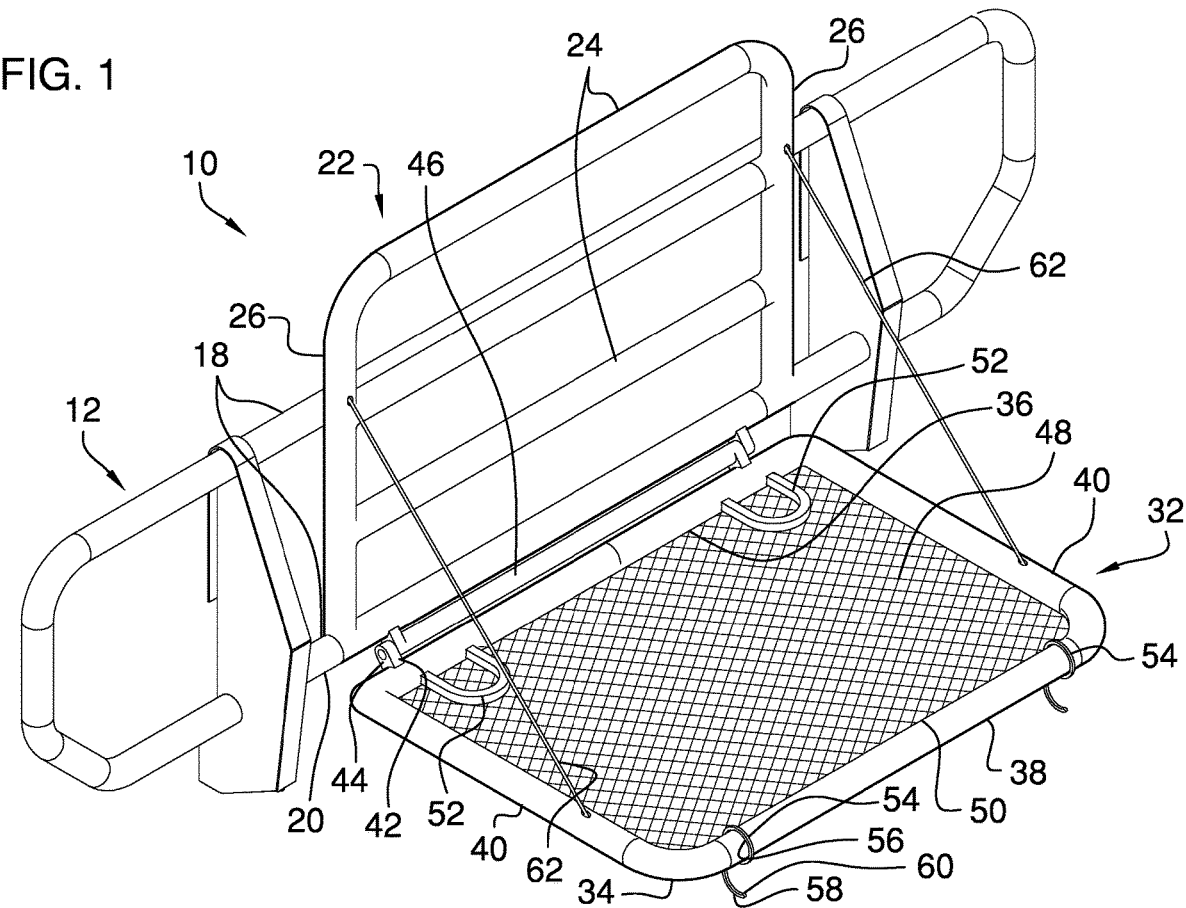
FIG. 1 is a front perspective view of a vehicle mounted chair assembly according to an embodiment of the disclosure.
Figure 2:
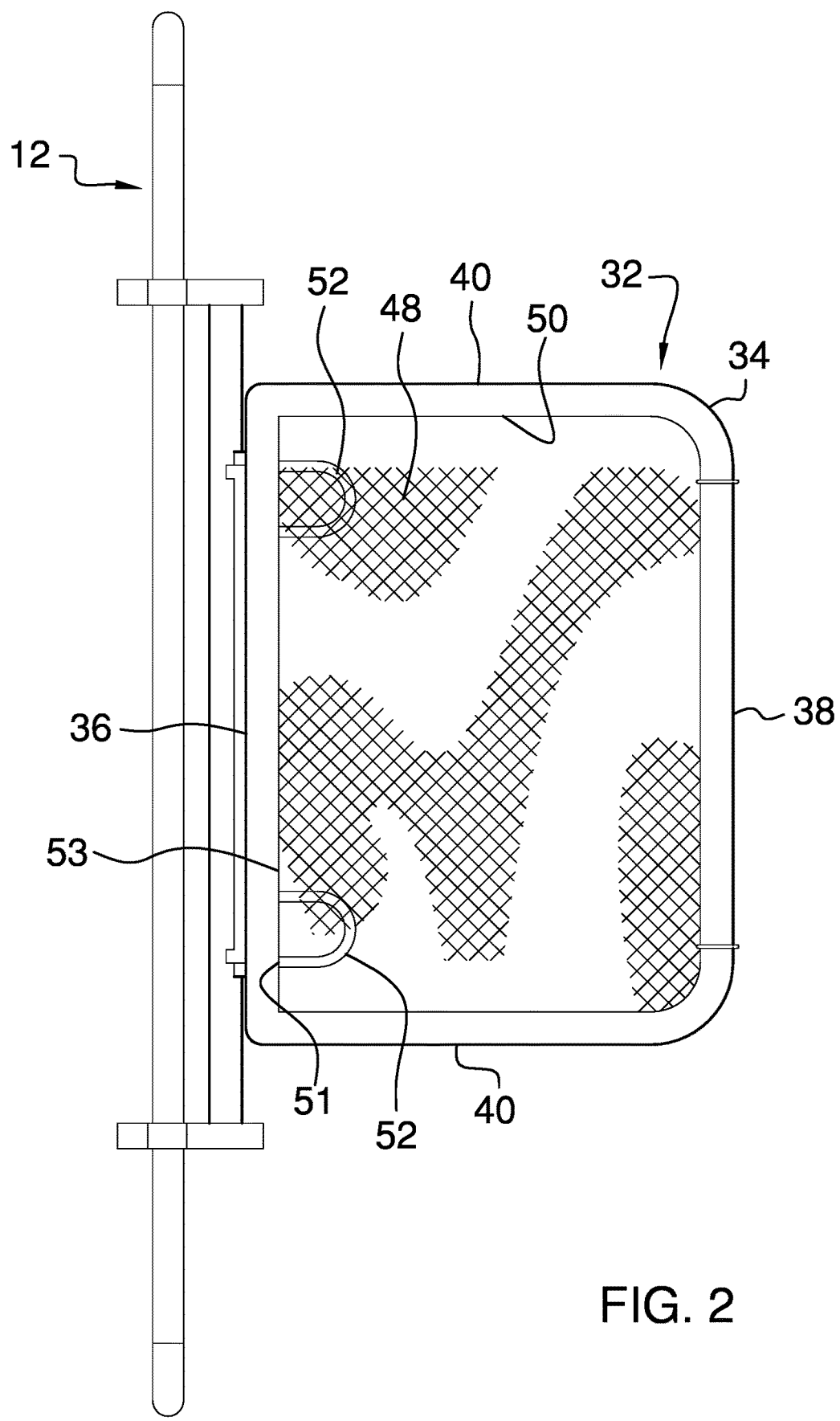
FIG. 2 is a top view of an embodiment of the disclosure.
Figure 3:
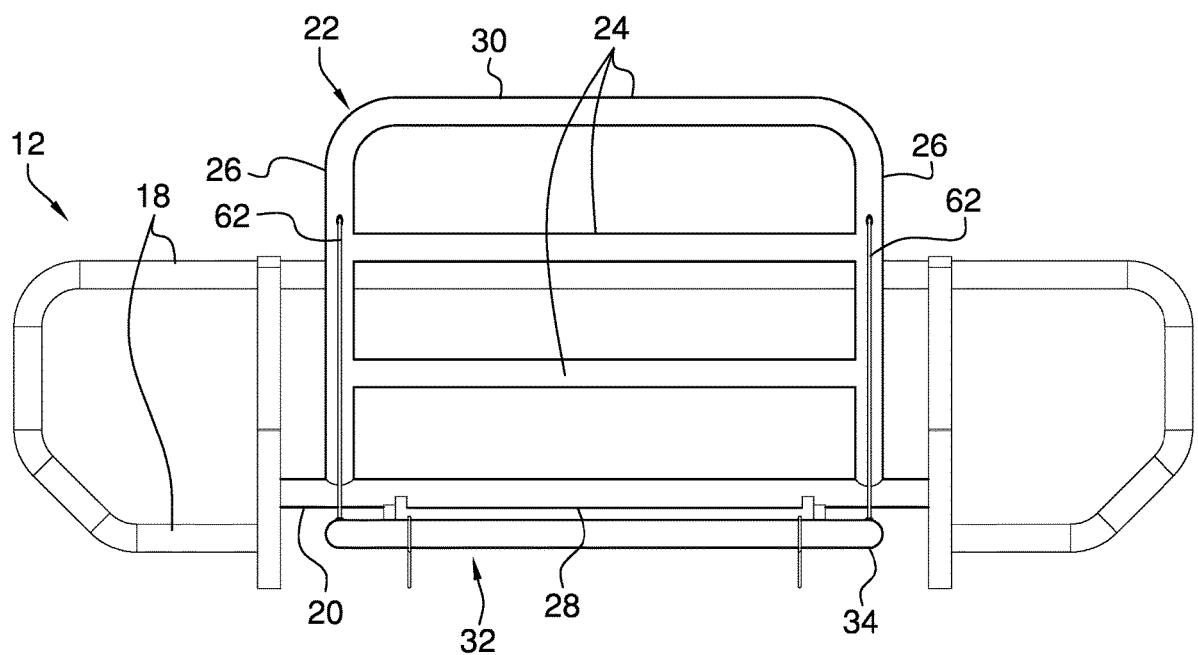
FIG. 3 is a front view of an embodiment of the disclosure.
Figure 4:
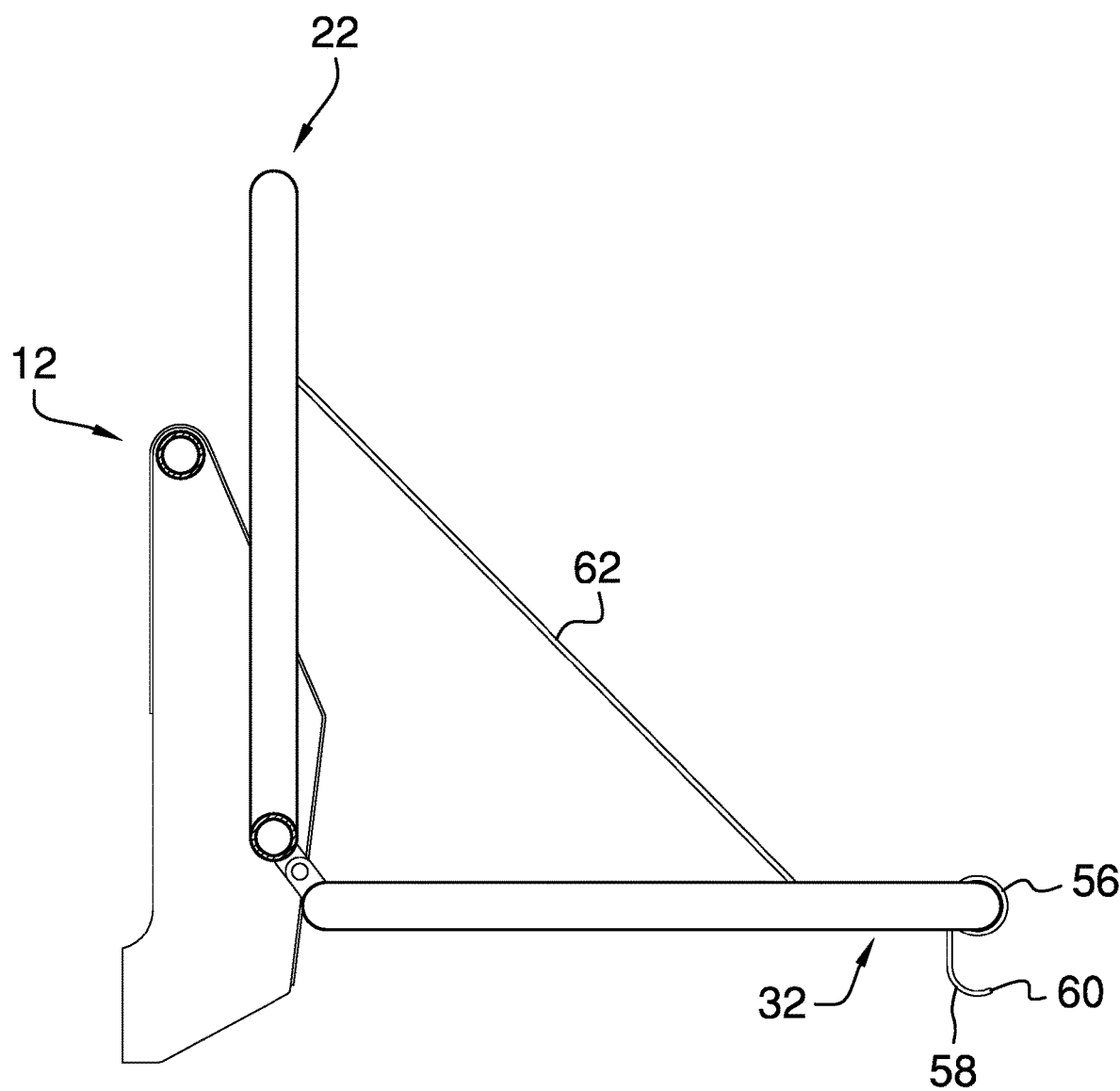
FIG. 4 is a right side view of an embodiment of the disclosure showing a chair in a deployed position.
Figure 5:
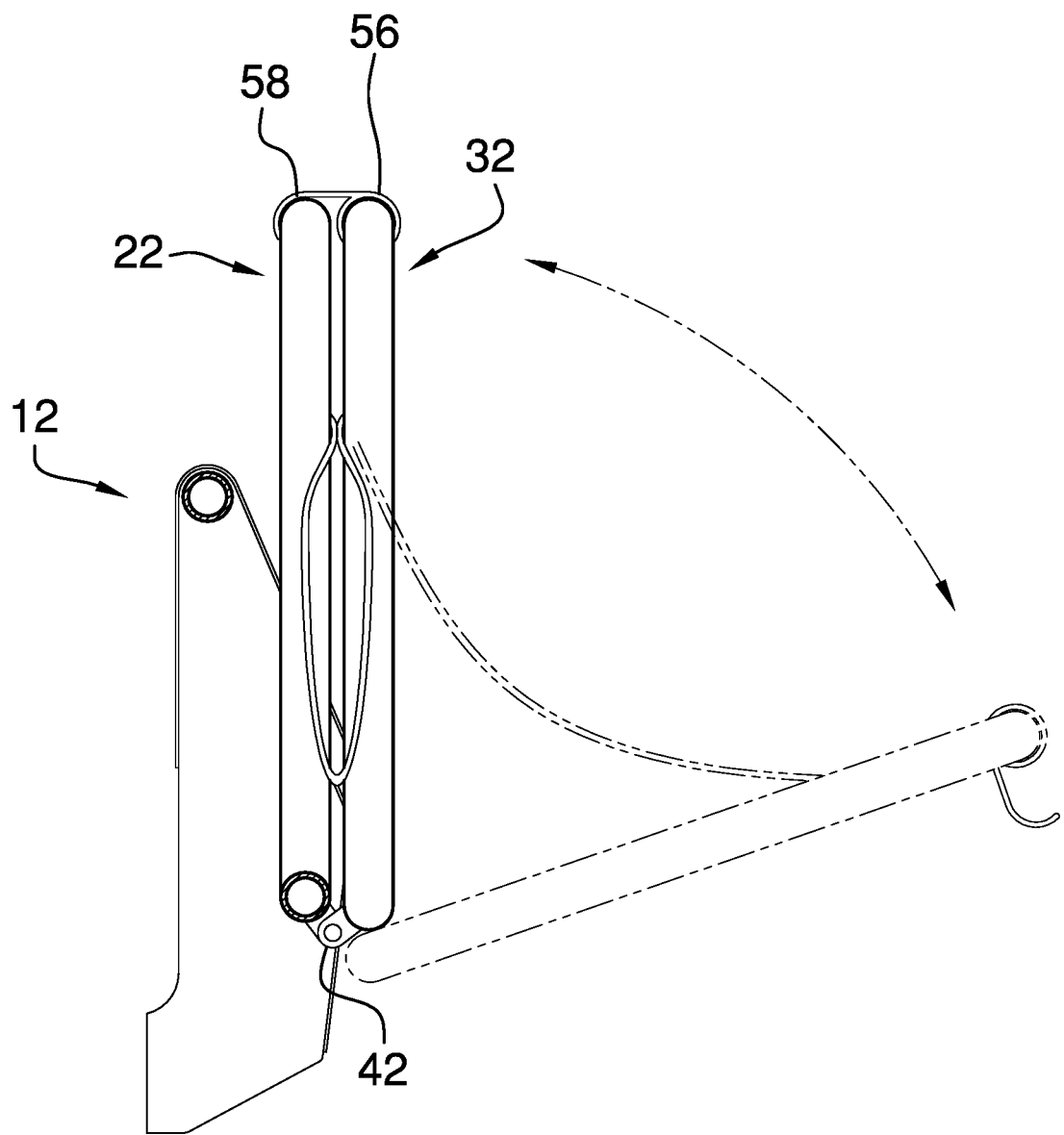
FIG. 5 is a right side view of an embodiment of the disclosure showing a chair in a stored position.
Figure 6:
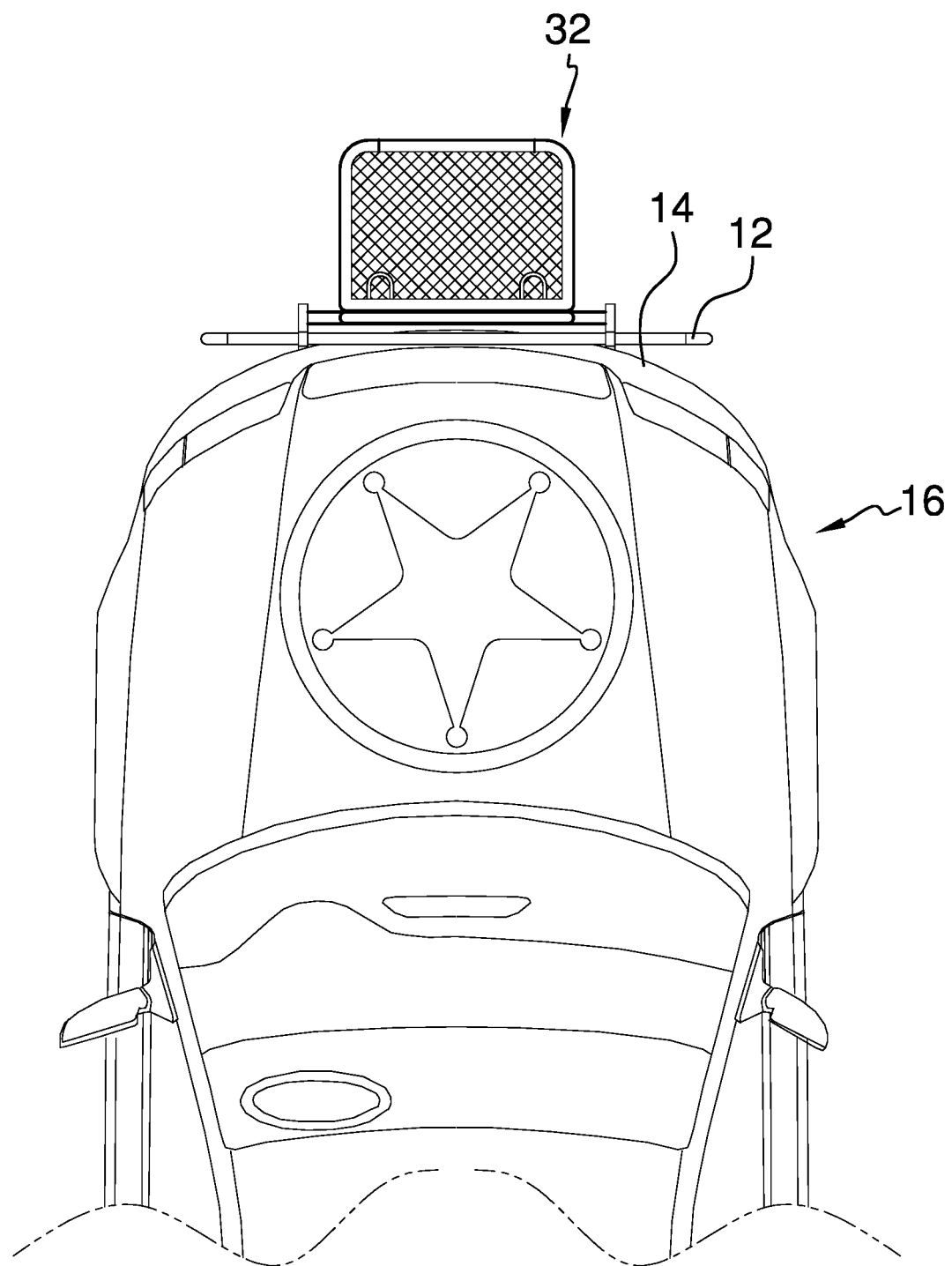
FIG. 6 is a perspective in-use view of an embodiment of the disclosure.

With reference now to the drawings, and in particular to FIGS. 1 through 7 thereof, a new chair device embodying the principles and concepts of an embodiment of the disclosure and generally designated by the reference numeral 10 will be described.

As best illustrated in FIGS. 1 through 7, the vehicle mounted chair assembly 10 generally comprises a grille guard 12 that is mountable to a front end 14 of a vehicle 16. The grille guard 12 has a series of members 18 that are horizontally oriented and are spaced apart from each other, and the series of members 18 includes a lowermost member 20. The vehicle 16 may be a law enforcement vehicle such as a police car. A back rest 22 is integrated into the grille guard 12 such that the back rest 22 extends upwardly in front of the series of members 18 of the grille guard 12. The back rest 22 comprises a plurality of first members 24 extending between a pair of second members 26.

Each of the first members 24 is horizontally oriented and the pair of second members 26 is vertically oriented. Furthermore, the first members 24 are spaced apart from each other and are distributed along a full length of the pair of second members 26. The plurality of first members 24 includes a bottom member 28 and a top member 30. The bottom member 28 is integrated into the lowermost member 20 of the series of members 18 of the grille guard 12.

A chair 32 is pivotally coupled to the back rest 22 and the chair 32 is positionable in a deployed position having the chair 32 lying on a horizontal plane. In this way an occupant can be seated on the chair 32. The chair 32 is positionable in a stored position having the chair 32 resting against the back rest 22. The chair 32 comprises a frame 34 that has a primary member 36 and a secondary member 38 each extending between a pair of outward members 40. Each of the primary member 36 and the secondary member 38 is aligned with a respective end of the outward members 40 such that the frame 34 defines a rectangle.

A hinge 42 is included which comprises a first portion 44 that pivotally engages a second portion 46. The first portion 44 is coupled to the primary member 36 and the second portion 46 is coupled to the bottom member 28 associated with the plurality of first members 24 of the back rest 22 such that the frame 34 is hingedly retained on the bottom member 28. The frame 34 lies on a plane that is perpendicularly oriented with the back rest 22 when the chair 32 is in the deployed position. Conversely, the frame 34 rests against the back rest 22 when the chair 32 is in the stored position.

The chair 32 includes a mesh net 48 that has a perimeter edge 50 and the perimeter edge 50 is coupled to each of the primary member 36 and the secondary member 38 and each of outward members 40. The mesh net 48 fully covers the rectangle defined by the frame 34 such that the mesh net 48 that can be sat upon by the occupant when the chair 32 is in the deployed position. A pair of loops 52 is provided that each has a first end 51 and a second end 53. Each of the loops 52 is curved between the first end 51 and the second end 53 such that the first end 51 of a respective loop 52 is spaced from the second end 53 of the respective loop 52. Each of the first end 51 and the second end 53 of each of the loops 52 is coupled to the primary member 36. In this way handcuffs worn on the occupant can be secured to a respective one of the loops 52 thereby facilitating a law enforcement officer to restrain the occupant on the chair 32.

Each of the loops 52 is positioned above the mesh net 48 when the chair 32 is in the deployed position. Each of the loops 52 is positioned adjacent to a respective one of the outward members 40 and each of the loops 52 is directed toward the secondary member 38. A pair of clips 54 is provided and each of the clips 54 comprises a ring 56 that extends around the secondary member 38. Each of the clips 54 comprises a curved member 58 that is coupled to and extends away from the ring 56. The curved member 58 has a distal end 60 with respect to the ring 56 and the curved member 58 is curved between the ring 56 and the distal end 60. In this way the curved member 58 can extend around the top member 30 of the back rest 22 when the chair 32 is positioned in the stored position for retaining the chair 32 in the stored position.

A pair of cables 62 is provided and each of the cables 62 is coupled between a respective one of the second members 26 of the back rest 22 and a respective one of the outward members 40 of the frame 34. Each of the cables 62 retains the frame 34 in a horizontal orientation when the chair 32 is positioned on the deployed position. In an alternative embodiment 64 as is most clearly shown in FIG. 7, a pair of cup holders 66 is each coupled to a respective one of the outward members 40 of the frame 34 to hold an object 68. The object 68 may be beverage container, a fishing rod or any other object that could fit into a cup holder.

Each of the cup holders 66 comprises a holding member 70 that has a first end 72 and a second end 74. The holding member 70 has a curved portion 76 extending between the first end 51 and the second end 53 of the holding member 70, and the curved portion 76 forms an open loop. The holding member 70 has a pair of straight portions 78 each extending between the curved portion 76 and a respective one of the first end 51 and the second end 53 of the holding member 70. Furthermore, each of the first end 51 and the second end 53 of the holding member 70 is coupled to the respective outward member 40 and the holding member 70 extends laterally away from the respective outward member 40.

The cup holders 66 include a net 80 that has an upper end 82 and a lower end 84. The upper end 82 is open and the lower end 84 is closed. Furthermore, the upper end 82 is coupled to the curved portion 76 of the holding member 70 having the net 80 extending downwardly from the curved portion 76. In this way the net 80 can insertably receive the object 68.

Figure 7:
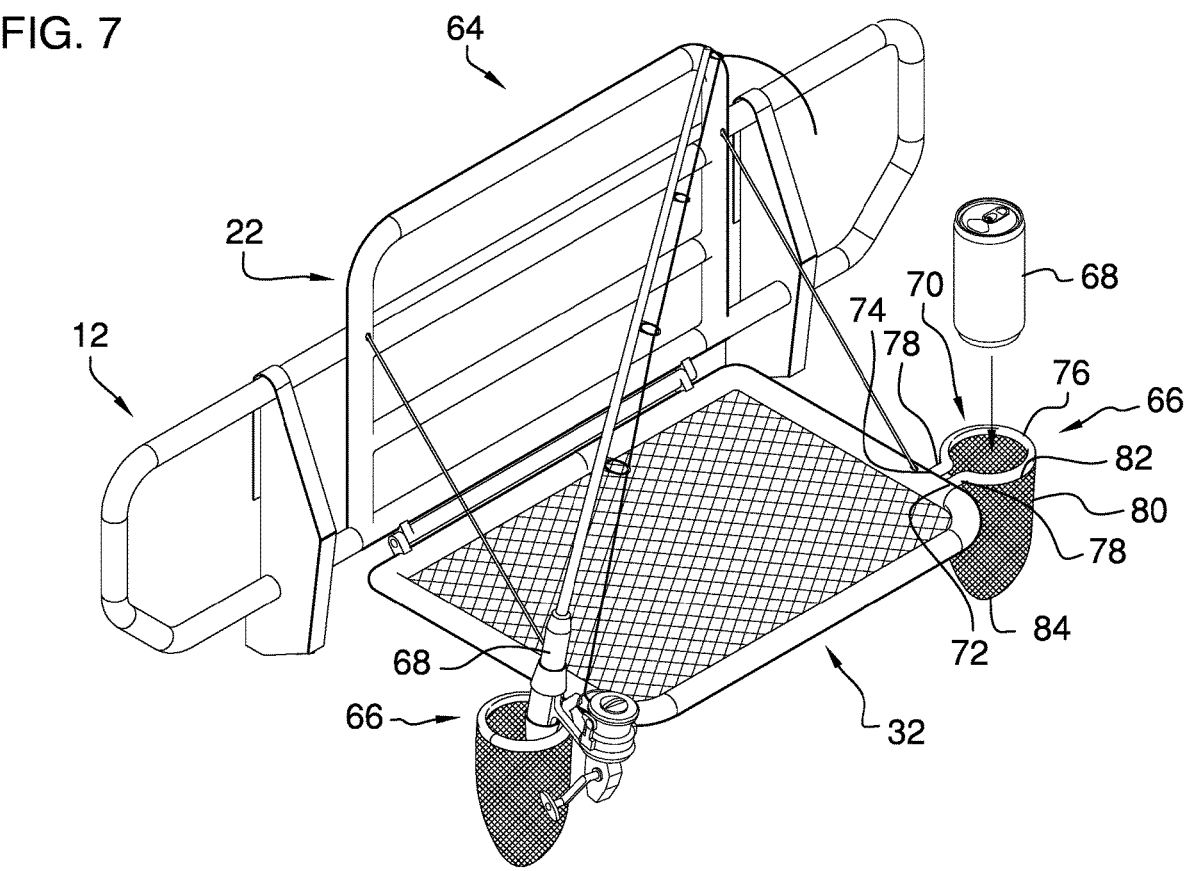
FIG. 7 is a perspective view of an alternative embodiment of the disclosure.

In use, the chair 32 is positioned in the stored position when the vehicle 16 is being driven. The chair 32 is positioned in the deployed positioned when the vehicle 16 is stationary. In this way a person being questioned by a law enforcement officer, for example, can be seated on the chair 32 rather than being seated on a sidewalk or a curb. Furthermore, the law enforcement officer can handcuff the person to a respective one of the loops 52. In this way the person can be restrained in a safe location to reduce the likelihood that the person will be injured by oncoming traffic, for example, and to inhibit the person from being able to evade the law enforcement officer. As is shown in FIG. 7, the chair 32 can be employed for leisure activities, such as fishing, camping or other outdoor activities that are enhanced by having a place to sit.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle mounted chair assembly for facilitating law enforcement officers to seat a perpetrator on a front end of an emergency vehicle during an investigation, said assembly comprising:
   a grille guard being mountable to a front end of a vehicle;
   a back rest being integrated into said grille guard such that said back rest extends upwardly in front of said series of members of said grille guard; and
   a chair being pivotally coupled to said back rest, said chair being positionable in a deployed position having said chair lying on a horizontal plane wherein said chair is configured to have an occupant being seated on said chair, said chair being positionable in a stored position having said chair resting against, said back rest;

wherein said grille guard has a series of members being horizontally oriented and being spaced apart from each other, series of members including a lowermost member; and wherein said back rest comprises a plurality of first members extending between a pair of second members, each of said first members being horizontally oriented, said pair of second members being vertically oriented, said first members being spaced apart from each other and being distributed along a full length of said pair of second members, said plurality of first members including a bottom member and a top member, said bottom member being integrated into said lowermost member of said series of members of said grille guard;

wherein said chair comprises
- a frame having a primary member and a secondary member each extending between a pair of outward members, each of said primary member and said secondary member being aligned with a respective end of said outward members such that said frame defines a rectangle,
- a hinge comprising a first portion pivotally engaging a second portion, said first portion being coupled to said primary member, said second portion being coupled to said bottom member associated with said plurality of first members of said back rest such that said frame is hingedly retained on said bottom member, said frame lying on a plane being perpendicularly oriented with said back rest when said chair is in said deployed position, said frame resting against said back rest when said chair is in said stored position, and
- a pair of clips, each of said clips comprising a ring extending around said secondary member, each of said clips comprising a curved member being coupled to and extending away from said ring, said curved member having a distal end with respect to said ring, said curved member being curved between said ring and said distal end thereby facilitating said curved member to extend around said top member of said back rest when said chair is positioned in said stored position for retaining said chair in said stored position.

2. The assembly according to claim 1, wherein said chair includes a mesh net having a perimeter edge, said perimeter edge being coupled to each of said primary member and said secondary member and each of outward members having said mesh net fully covering said rectangle defined by said frame wherein said mesh net is configured to be sat upon by the occupant when said chair is in said deployed position.

3. The assembly according to claim 2, wherein:
- said chair includes a pair of loops each having a first end and a second end, each of said loops being curved between said first end and said second end such that said first end of a respective loop is spaced from said second end of said respective loop, each of said first end and said second end of each of said loops being coupled to said primary member wherein each of said loops is configured to facilitate handcuffs worn on the occupant to be secured to a respective one of said loops thereby facilitating a law enforcement officer to restrain the occupant on said chair;
- each of said loop is positioned above said mesh net when said chair is in said deployed position; and
- each of said loops is positioned adjacent to a respective one of said outward members, each of said loops being directed toward said secondary member.

4. The assembly according to claim 1, further comprising a pair of cables, each of said cables being coupled between a respective one of said second members of said back rest and a respective one of said outward members of said frame, each of said cables retaining said frame in a horizontal orientation when said chair is positioned on said deployed position.

5. A vehicle mourned chair assembly for facilitating law enforcement officers to seat a perpetrator on a front end of an emergency vehicle during an investigation, said assembly comprising:
- a grille guard being mountable to a front end of a vehicle, said grille guard having a series of members being horizontally oriented and being spaced apart from each other, series of members including a lowermost member;
- a back rest being integrated into said grille guard such that said back rest extends upwardly in front of said series of members of said grille guard, said back rest comprising a plurality of first members extending between a pair of second members, each of said first members being horizontally oriented, said pair of second members being vertically oriented, said first members being spaced apart from each other and being distributed along a full length of said pair of second members, said plurality of first members including a bottom member and a top member, said bottom member being integrated into said lowermost member of said series of members of said grille guard;
- a chair being pivotally coupled to said back rest, said chair being positionable in a deployed position having said chair lying on a horizontal plane wherein said chair is configured to have an occupant being seated on said chair, said chair being positionable in a stored position having said chair resting against said back rest, said chair comprising:
  - a frame having a primary member and a secondary member each extending between a pair of outward members, each of said primary member and said secondary member being aligned with a respective end of said outward members such that said frame defines a rectangle;
  - a hinge comprising a first portion pivotally engaging a second portion, said first portion being coupled to said primary member, said second portion being coupled to said bottom member associated with said plurality of first members of said back rest such that said frame is hingedly retained on said bottom member, said frame lying on a plane being perpendicularly oriented with said back rest when said chair is in said deployed position, said frame resting against said back rest when said chair is in said stored position;
  - a mesh net having a perimeter edge, said perimeter edge being coupled to each of said primary member and said secondary member and each of outward members having said mesh net fully covering said rectangle defined by said frame wherein said mesh net is configured to be sat upon by the occupant when said chair is in said deployed position;
  - a pair of loops each having a first end and a second end, each of said loops being curved between said first end and said second end such that said first end of a respective loop is spaced from said second end of said respective loop, each of said first end and said second end of each of said loops being coupled to said primary member wherein each of said loops is configured to facilitate handcuffs worn on the occupant to be secured to a respective one of said loops thereby facilitating a law enforcement officer to restrain the occupant on said chair, each of said loop being positioned above said mesh net when said chair is in said deployed position, each of said loops being positioned adjacent to a respective one of said outward members, each of said loops being directed toward said secondary member;

a pair of clips, each of said clips comprising a ring extending around said secondary member, each of said clips comprising a curved member being coupled to and extending away from said ring, said curved member having a distal end with respect to said ring, said curved member being curved between said ring and said distal end thereby facilitating said curved member to extend around said top member of said back rest when said chair is positioned in said stored position for retaining said chair in said stored position; and a pair of cables, each of said cables being coupled between a respective one of said second members of said back rest and a respective one of said outward members of said frame, each of said cables retaining said frame in a horizontal orientation when said chair is positioned on said deployed position.

6. The assembly according to claim 5, further comprising a pair if cup holders, each of said cup holders being coupled to a respective one of said outward members of said frame wherein each of said cup holders is configured to hold an object, each of said cup holders comprising:

a holding member having a first end and a second end, said holding member having a curved portion extending between said first end and said second end of said holding member, said curve portion forming an open loop, said holding member having a pair of straight portions each extending between said curved portion and a respective one of said first end and said second end of said holding member, each of said first end and said second end of said holding member being coupled to said respective outward member, said holding member extending laterally away from said respective outward member; and a net having an upper end and a lower end, said upper end being open, said lower end being closed, said upper end being coupled to said curved portion of said holding member having said net extending downwardly from said curved portion wherein said net is configured to insertably receive the object.

* * * * *